(12) United States Patent
Piras et al.

(10) Patent No.: US 11,268,935 B2
(45) Date of Patent: Mar. 8, 2022

(54) METHOD OF AND ATOMIC FORCE MICROSCOPY SYSTEM FOR PERFORMING SUBSURFACE IMAGING

(71) Applicant: Nederlandse Organisatie voor toegepast-natuurwetenschappelijk onderzoek TNO, s-Gravenhage (NL)

(72) Inventors: Daniele Piras, Amsterdam (NL); Paul Louis Maria Joseph van Neer, Bergschenhoek (NL); Maarten Hubertus van Es, Voorschoten (NL); Hamed Sadeghian Marnani, Nootdorp (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 86 days.

(21) Appl. No.: 16/500,516

(22) PCT Filed: Apr. 4, 2018

(86) PCT No.: PCT/NL2018/050209
§ 371 (c)(1),
(2) Date: Oct. 3, 2019

(87) PCT Pub. No.: WO2018/186742
PCT Pub. Date: Oct. 11, 2018

(65) Prior Publication Data
US 2020/0057028 A1 Feb. 20, 2020

(30) Foreign Application Priority Data

Apr. 4, 2017 (EP) .................................. 17164817

(51) Int. Cl.
*G01N 29/06* (2006.01)
*G01Q 60/32* (2010.01)
*G01Q 70/06* (2010.01)

(52) U.S. Cl.
CPC ......... *G01N 29/0681* (2013.01); *G01Q 60/32* (2013.01); *G01Q 70/06* (2013.01)

(58) Field of Classification Search
CPC ..... G01N 29/0681; G01Q 60/32; G01Q 70/06
(Continued)

(56) References Cited

U.S. PATENT DOCUMENTS

| 5,831,739 A | 11/1998 | Ota |
| 6,369,385 B1 | 4/2002 | Muray et al. |

(Continued)

FOREIGN PATENT DOCUMENTS

| WO | WO 2008/141301 A1 | 11/2008 |
| WO | WO 2012/044811 A1 | 4/2012 |
| WO | WO 2014/057268 A1 | 4/2014 |

OTHER PUBLICATIONS

European Patent Office, International Search Report in corresponding International Application No. PCT/NL2018/050209, dated Jun. 21, 2018 (pages).

(Continued)

*Primary Examiner* — Lisa M Caputo
*Assistant Examiner* — Rose M Miller
(74) *Attorney, Agent, or Firm* — Leydig, Voit & Mayer, Ltd.

(57) ABSTRACT

The document relates to a method of performing subsurface imaging of embedded structures underneath a substrate surface, using an atomic force microscopy system. The system comprises a probe with a probe tip, and a sensor for sensing a position of the probe tip. The method comprises the steps of: positioning the probe tip relative to the sub- (Continued)

strate: applying a first acoustic input signal to the substrate; applying a second acoustic input signal to the substrate; detecting an output signal from the substrate in response to the first and second acoustic input signal; and analyzing the output signal. The first acoustic input signal comprises a first signal component and a second signal component, the first signal component comprising a frequency below 250 megahertz and the second signal component either including a frequency below 2.5 megahertz or a frequency such as to provide a difference frequency of at most 2.5 megahertz with the first signal component, such as to enable analysis of an induced stress field in the substrate; and wherein the second acoustic input signal comprises a third signal component having a frequency above 1 gigahertz, such that the return signal includes a scattered fraction of the second acoustic input signal scattered from the embedded structures. This enables to perform imaging a various depths in one pass, across a large range of depths.

18 Claims, 4 Drawing Sheets

(58) Field of Classification Search
USPC .......................................................... 73/606
See application file for complete search history.

(56) References Cited

U.S. PATENT DOCUMENTS

| | | | |
|---|---|---|---|
| 6,704,089 | B2 | 3/2004 | van der Schaar et al. |
| 7,397,596 | B2 | 7/2008 | Yacoubian |
| 7,526,949 | B1 | 5/2009 | Liu et al. |
| 8,302,480 | B2 | 11/2012 | Maris et al. |
| 8,746,070 | B2 | 6/2014 | Tippit, Jr. et al. |
| 10,935,568 | B2* | 3/2021 | van Es ................ G03F 7/70633 |
| 2008/0295584 | A1* | 12/2008 | Cantrell ................ G01Q 60/32 |
| | | | 73/105 |
| 2016/0170063 | A1 | 6/2016 | Leggett et al. |
| 2020/0124571 | A1* | 4/2020 | Piras ................ G01N 29/2437 |

OTHER PUBLICATIONS

Dong Ryul Kwak et al., "Visualization of Interior Structures with Nanoscale Resolution Using Ultrasonic-Atomic Force Microscopy," Proc. of SPIE, vol. 8691, pp. 869117-1 to 869117-9, © 2013.
Mo Li et al., "Ultra-Sensitive NEMS-Based Cantilevers for Sensing, Scanned Probe and Very High-Frequency Applications," Nature Nanotechnology, vol. 2, pp. 114-120 (2007).
Shuiqing Hu et al., "Imaging of Subsurface Structures Using Atomic Force Acoustic Microscopy at GHz Frequencies," Journal of Applied Physics, vol. 109, 084324-1 to 084324-6 (2011).
Chang Liu, "Parallel Scanning Probe Arrays: Their Applications," Materials Today, Microscopy Special Issue, pp. 22-29, ISSN: 1369 7021 © Elsevier Ltd. 2008.

* cited by examiner

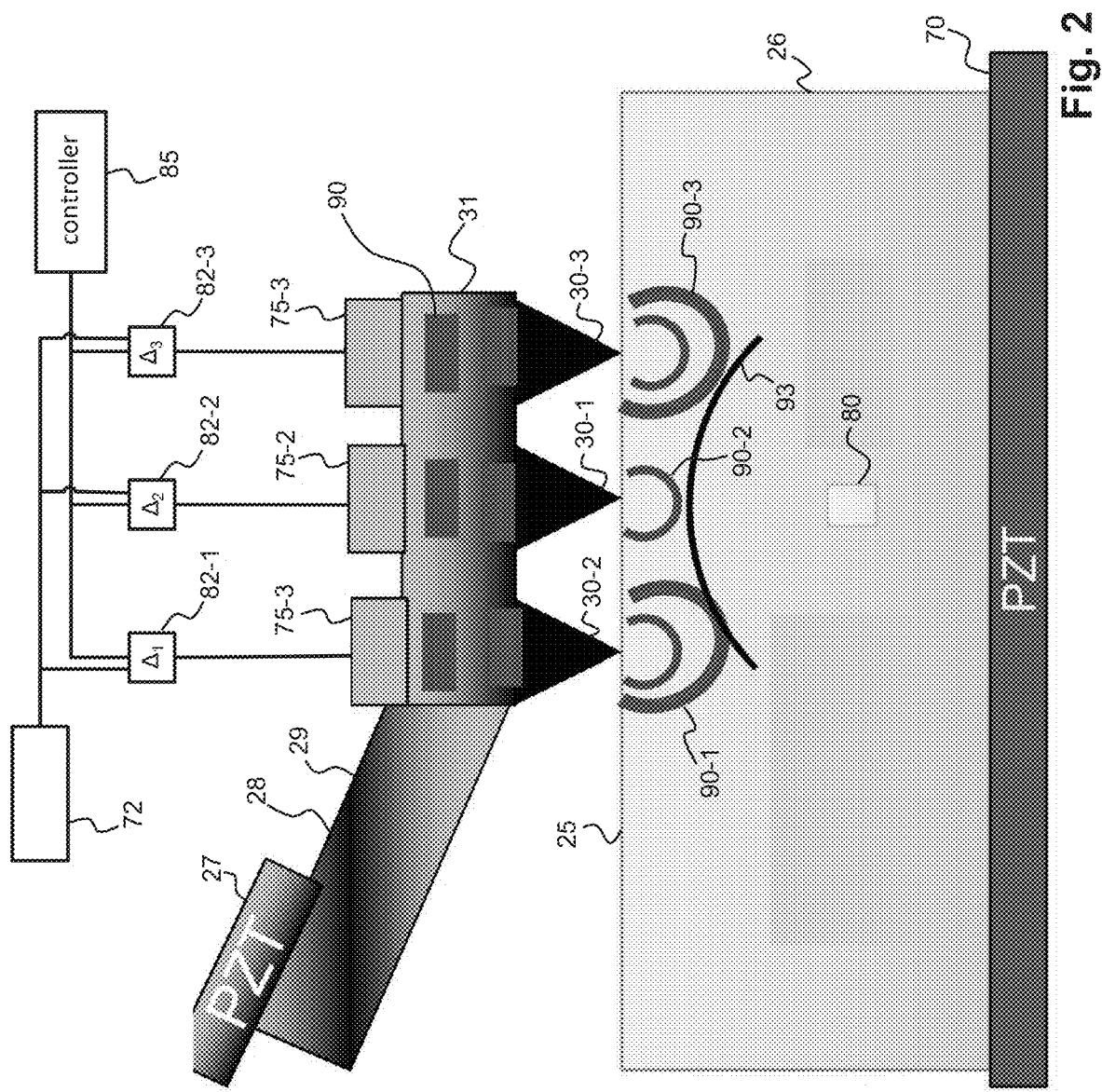

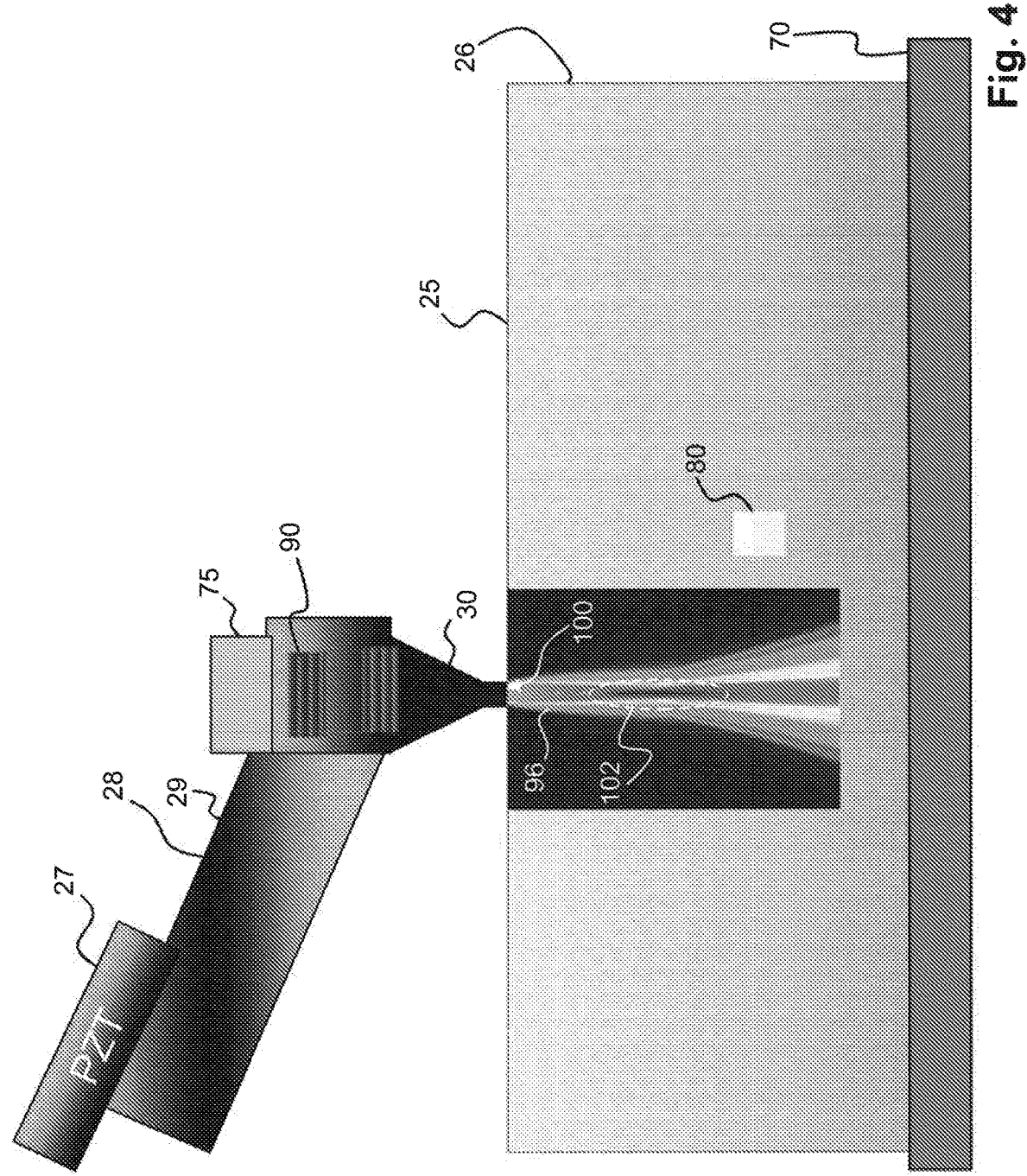

METHOD OF AND ATOMIC FORCE MICROSCOPY SYSTEM FOR PERFORMING SUBSURFACE IMAGING

CROSS-REFERENCE TO RELATED APPLICATIONS

This patent application is a U.S. National Phase of PCT International Application No. PCT/NL2018/050209, filed Apr. 4, 2018, which claims priority to European Application No. 17164817.3, filed Apr. 4, 2017, which are both expressly incorporated by reference in their entireties, including any references contained therein.

FIELD OF THE INVENTION

The present invention is directed at a method of performing subsurface imaging of one or more embedded structures in a substrate underneath a substrate surface, the method being performed using an atomic force microscopy system, wherein the atomic force microscopy system comprises a probe with at least one probe tip, and a sensor for sensing a position of the probe tip for detecting probe tip motion, the method comprising the steps of: positioning the probe tip relative to the substrate for establishing contact between the probe tip and the substrate surface; applying, using at least one first signal application actuator, a first acoustic input signal to the substrate; applying, using at least one second signal application actuator, a second acoustic input signal to the substrate; detecting, using the sensor, an output signal from the substrate in response to the first and second acoustic input signal; and analyzing the output signal for obtaining information on the embedded structures, for enabling imaging thereof.

The invention is further directed at an atomic force microscopy system configured for performing subsurface imaging of one or more embedded structures in a substrate underneath a substrate surface, wherein the atomic force microscopy system comprises a probe with at least one probe tip, and a sensor for sensing a position of the probe tip for detecting probe tip motion.

BACKGROUND

Developments in the semiconductor industry are typically governed by Moore's law which predicts that the number of transistors in a dense integrated circuit doubles every two years. As will be appreciated, this poses significant technological challenges whenever technological boundaries constituted by physical laws are encountered and need to be overcome to meet the industry demands for even smaller and smaller integrated circuits.

A new type of structures that is presently on the rise are the three dimensional NAND or 3D NAND type memory structures. The term NAND, in this context, is not an abbreviation or acronym, but refers to the logical operation NAND or in other words NOT(AND( . . . , . . . )). 3D NAND devices consist of hundreds of stacked device layers having a total thickness of a few micrometers. In order to enable monitoring and inspection of alignment, overlay and/or product metrology during and after manufacturing of such devices, a subsurface imaging technology is to be applied that allows to visualize even nanometer structures buried deeply (several micrometers) below the surface of the device.

Acoustic type atomic force microscopy (AFM) has been proposed as a suitable technology to perform subsurface imaging on semiconductor structures. These methods typically apply an ultrasound signal to a sample or sometimes to the probe, while scanning the sample in contact mode (ultrasonic atomic force microscopy (UAFM)). As a result of the applied ultrasound signal, the interaction between the probe and the surface contains a component that is dependent on the elastic properties of the sample. Due to the fact that buried structures underneath a sample alter the local contact elasticity between the probe tip and the surface, the application of the ultrasound signal and proper analysis of the probes deflection (i.e. via the output signal) allows to visualize subsurface structures. In particular, the detection of subsurface structures by means of ultrasonic AFM is based on resonance frequency shifts of a cantilever that are due to contact stiffness changes. Such resonance shift is detected by measuring the amplitude or phase change at a single frequency.

A disadvantage of the abovementioned ultrasonic atomic force microscopy methods for subsurface imaging, is that although they work well for performing all kinds of imaging, monitoring and inspection at shallow depths, they are unable to do so at greater depths. In particular during manufacturing of semiconductor elements, there is a desire to monitor or check for overlay error between layers at various depths of the device manufactured.

SUMMARY OF THE INVENTION

It is an object of the present invention to provide a method of and system for performing subsurface imaging, in particular to perform imaging of layers at various depths.

To this end, there is provided herewith a method of performing subsurface imaging of one or more embedded structures in a substrate underneath a substrate surface, the method being performed using an atomic force microscopy (AFM) system, wherein the atomic force microscopy system comprises a probe with at least one probe tip, and a sensor for sensing a position of the probe tip for detecting probe tip motion, the method comprising the steps of: positioning the probe tip relative to the substrate for establishing contact between the probe tip and the substrate surface; applying, using at least one first signal application actuator, a first acoustic input signal to the substrate; applying, using at least one second signal application actuator, a second acoustic input signal to the substrate; detecting, using the sensor, an output signal from the substrate in response to the first and second acoustic input signal; and analyzing the output signal for obtaining information on the embedded structures, for enabling imaging thereof; wherein the first acoustic input signal comprises a first signal component and a second signal component, the first signal component comprising a frequency below 250 megahertz, and the second signal component either including a frequency below 2.5 megahertz or a frequency such as to provide a difference frequency of at most 2.5 megahertz with the first signal component, such as to enable analysis of an induced stress field in the substrate; and wherein the second acoustic input signal comprises a third signal component having a frequency above 1 gigahertz, such that the return signal includes a scattered fraction of the second acoustic input signal scattered from the embedded structures.

The present invention enables to perform imaging a various depths in one pass, across a large range of depths. This may, for example, be used for monitor of overlay error between layers at shallow and at larger depths at the same time. For examples, the exact and correct positioning of features at shallow depths (e.g. up to a few hundreds (for example 300) of nanometers below the surface) may be checked against the presence of other features at deeper layers (e.g. up to a few micrometers below the surface or deeper (e.g. <100 micrometers).

The first acoustic input signal, comprising a first signal component having a frequency below 250 megahertz and a second signal component having a frequency below 2.5 megahertz, enables to perform subsurface imaging using stiffness elasticity as contrast medium. This typically enables subsurface imaging with large signal-to-noise ratio at shallow depths, e.g. up to 0.3 micrometers below the surface, enabling accurate imaging of the top few layer of a sample (e.g. a device being manufactured or after manufacturing) below the surface.

The second acoustic input signal, comprising a third signal component having a frequency above 1 gigahertz, enables to perform subsurface imaging using ultrasound scattering as contrast medium. At these frequencies, the system is diffraction limited and thus the wavelength of the signal determines the dimensions that are still visible in the output signal. Most important though, due to the fact that the contrast mechanism is based on scattering of the waves (rather than an elastic stress field), measuring at these frequencies may be performed at much larger penetration depths as compared to the measurements at lower frequencies. Thus, the second acoustic input signal applied to the substrate or sample enables the imaging of deeply buried layers.

Together, the first acoustic input signal enables visualization through elastic deformation at shallow depths below the surface (i.e. the elastic stress field), whereas the second acoustic input signal is sent into the sample providing a return signal including a scattered fraction (an echo) or—in transmission mode—the second acoustic input signal whose wave-front is distorted due to the said scattered fraction. The combination thereby enables visualization in one pass at different depths across a wide range of depths. This enables to integrate this imaging technique in semiconductor manufacturing methods and to thereby enable device inspection across layers that may be remotely apart with one pass of the AFM. For example, the identification of overlay errors in complex device designs is possible in this manner. This improves the quality of the semiconductor devices manufactured, and enables complicated device designs with accurately positioned elements that may be collocated or overlapping at various depths to be manufactured within specs.

In accordance with some embodiments, the at least one second signal application actuator is attached to the at least one probe tip, wherein at least the second acoustic input signal is applied via the at least one probe tip. Application via the probe tip provides the second acoustic input signal as a point source emerging from the location of the probe tip into the sample. The second signal application actuator can then simultaneously be used as sensor for receiving the scattered return signal.

The first acoustic input signal may in some embodiments be applied by means of two or more piezo type actuators, one of which is located below the sample to apply the first signal component of high frequency (smaller than or equal to 250 megahertz). The other piezo, which may be located either on or near the probe or attached to the sample, applies the second signal component of low frequency (smaller than 2.5 megahertz). Alternatively, a low frequency component may be provided using a heterodyne type method, by mixing two slightly different frequencies (e.g. both up to 250 megahertz) having a difference frequency that provides the low frequency component. Typically, this low frequency component, in accordance with this and other embodiments, is selected to be close to (e.g. within 5%) of a resonance mode frequency of the cantilever of the probe or of the probe tip.

To overcome or eliminate any inaccuracy caused by surface roughness or unevenness of the surface, in accordance with a further embodiment of the method of the invention, the at least one probe comprises a plurality of probe tips forming a probe tip array, wherein during the step of positioning the probe is positioned such as to establish contact between the substrate surface and each of the probe tips. In this event, the multiple probe tips take measurements at multiple locations, enabling elimination or averaging out of differences.

The above described embodiments may be combined in the following preferred embodiments, wherein a plurality of second signal application actuators is attached to the plurality of probe tips, such that each probe tip having associated therewith at least one of the second signal application actuators, for applying a plurality of second acoustic input signals through the plurality of probe tips, wherein the method comprises: controlling, using a controller, operation of the second signal application actuators such as to control a phase difference between each two signals of the plurality of second acoustic input signals, such as to provide a combined wave front of the plurality of second acoustic input signals having a controllable shape. These embodiments provide the advantageous possibility of creating a wave front by proper control over the operation of the second signal application actuators located above each probe tip of the probe tip array. In particular, providing each of the second acoustic input signal with a well selected and controlled phase shift, enables to shape the wave front suitably to provide a number of different advantageous effects. The phase shifts may be achieved using controllable delays for each of the second signal application actuators, enabling any shaped wave front to be designed. These embodiments allow a phased array imaging concept to be combined with the abovementioned advantages of multiple probe tips.

Using this phased array imaging concept, various further advantages may be obtained in some embodiments of the method of the invention. In these further embodiments, the controlling of the second signal application actuators is performed such as to generate at least one of: a focused wave front focused at a focal point relative to the probe tips; a defocused wave front; a plane wave front, wherein the plane wave front is at least one of parallel to the substrate surface or under an angle with the substrate surface; and a curved wave front.

The advantages of phased array imaging may be achieved in a different manner wherein phase differences are provided differently. In these embodiments, the probe comprises a cantilever having a front end where the at least one probe tip is located and a back end forming a remote opposite end of the cantilever relative to the front end, wherein the at least one second signal application actuator is attached to the cantilever at the back end, the method comprising applying the second acoustic input signal as a guided wave through the cantilever, and wherein a phase of the second acoustic input signal applied via each probe tip is dependent on a relative position of the respective probe tip, wherein the positions of the probe tips is such as to provide a combined wave front having a shape determined by the phases of the second acoustic input signal applied via each probe tip. The guided wave type input signal propagates through the cantilever, having a propagation velocity dependent on the dimensions of the cross section of the cantilever (transverse to the longitudinal direction), primarily on the thickness. The propagation velocity is further dependent on the frequency of the applied signal. The dimensions of the cantilever being fixed for that cantilever, the frequency spectrum of the applied signal may be designed properly to obtain a desired velocity profile. Even without this, the guided waves travelling through the cantilever will reach the most nearby probe tip of the plurality of probe tips first, and subsequently the other probe tips are reached dependent on their distance to the back end of the cantilever. This, amongst the different probe tips, also provides a phase difference that may be used to shape the wave front of the combined second acoustic input signal fractions applied via the probe tips. In particular, in some embodiments, the positions of the plurality of probe tips is such as to provide at least one of a non-plane wave front, or a plane wave front which is at least one of parallel to the substrate surface or under an angle with the substrate surface.

In yet other embodiments of the present invention, the probe tip comprises a contact surface for being in contact with the substrate surface, wherein, for providing the second acoustic input signal as a point source signal, the contact surface has contact surface area smaller than $1.25*10^3$ square nanometer, such as a contact surface radius smaller than 20 nanometer; or wherein, for providing the second acoustic input signal as a sound beam, the contact surface has contact surface area larger than $1.25*10^3$ square nanometer such as a contact surface radius smaller than 20 nanometer, preferable larger than $1.25*10^3$ square nanometer such as a contact surface radius larger than 200 nanometer, more preferable larger than $7.85*10^5$ square nanometer such as a contact surface radius smaller than 500 nanometer. The large contact area in the latter case of the contact surface of the probe tip changes the applied second acoustic input signal from being a point source to becoming an excitation field associated with such larger apertures. This causes the second acoustic input signal to be applied as a sound beam. The advantage of this is that, dependent on the size and shape of the contact area and the frequency of the signal in combination with the speed of sound in the respective material of the sample, the sound beam may be focused within the sample. In particular, the sound intensity within the beam will depend on the location within the beam, the intensity having a maximum within a small area in the middle of the beam around a certain depth. Any distortion caused by local material differences of elements embedded in the sample that coincide with the focal area of the beam, will provide a strong return signal providing access to information regarding the properties of such embedded elements. Because the focal area is dependent not only on the size of the contact area, but also on the shape thereof, in accordance with some embodiments, the probe tip comprises a contact surface for being in contact with the substrate surface, wherein the contact surface has shape selected from a group comprising: square, rectangle, circular, oval, square or rectangular with rounded corners, triangular, or polygonal.

In a second aspect of the invention, there is provided an atomic force microscopy system configured for performing subsurface imaging of one or more embedded structures in a substrate underneath a substrate surface, wherein the atomic force microscopy system comprises a probe with at least one probe tip, and a sensor for sensing a position of the probe tip for detecting probe tip motion, the system further comprising: an actuator stage for positioning the probe tip relative to the substrate for establishing contact between the probe tip and the substrate surface; at least one first signal application actuator for applying a first acoustic input signal to the substrate; at least one second signal application actuator for applying a second acoustic input signal to the substrate; wherein the sensor is configured for detecting an output signal from the substrate in response to the first and second acoustic input signal; wherein the system further comprises an analyzer configured for analyzing the output signal for obtaining information on the embedded structures for enabling imaging thereof; and wherein the first signal application actuator is configured for applying the first acoustic input signal comprising a first signal component and a second signal component, the first signal component comprising a frequency below 250 megahertz, and the second signal component either including a frequency below 2.5 megahertz or a frequency such as to provide a difference frequency of at most 2.5 megahertz with the first signal component, such as to enable analysis of an induced stress field in the substrate; and wherein the second signal application actuator is configured for applying the second acoustic input signal comprising a third signal component having a frequency above 1 gigahertz, such that the return signal includes a scattered fraction of the second acoustic input signal scattered from the embedded structures.

The actuator stage may for example be a scan head of the atomic force microscope, enabling scanning of the probe relative to the surface of the sample to perform imaging of an area in accordance with the method of the first aspect of the invention.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 2 schematically illustrates a method in accordance with an embodiment of the invention;

FIG. 4 schematically illustrates a method in accordance with an embodiment of the invention;

DETAILED DESCRIPTION

Figure 1:
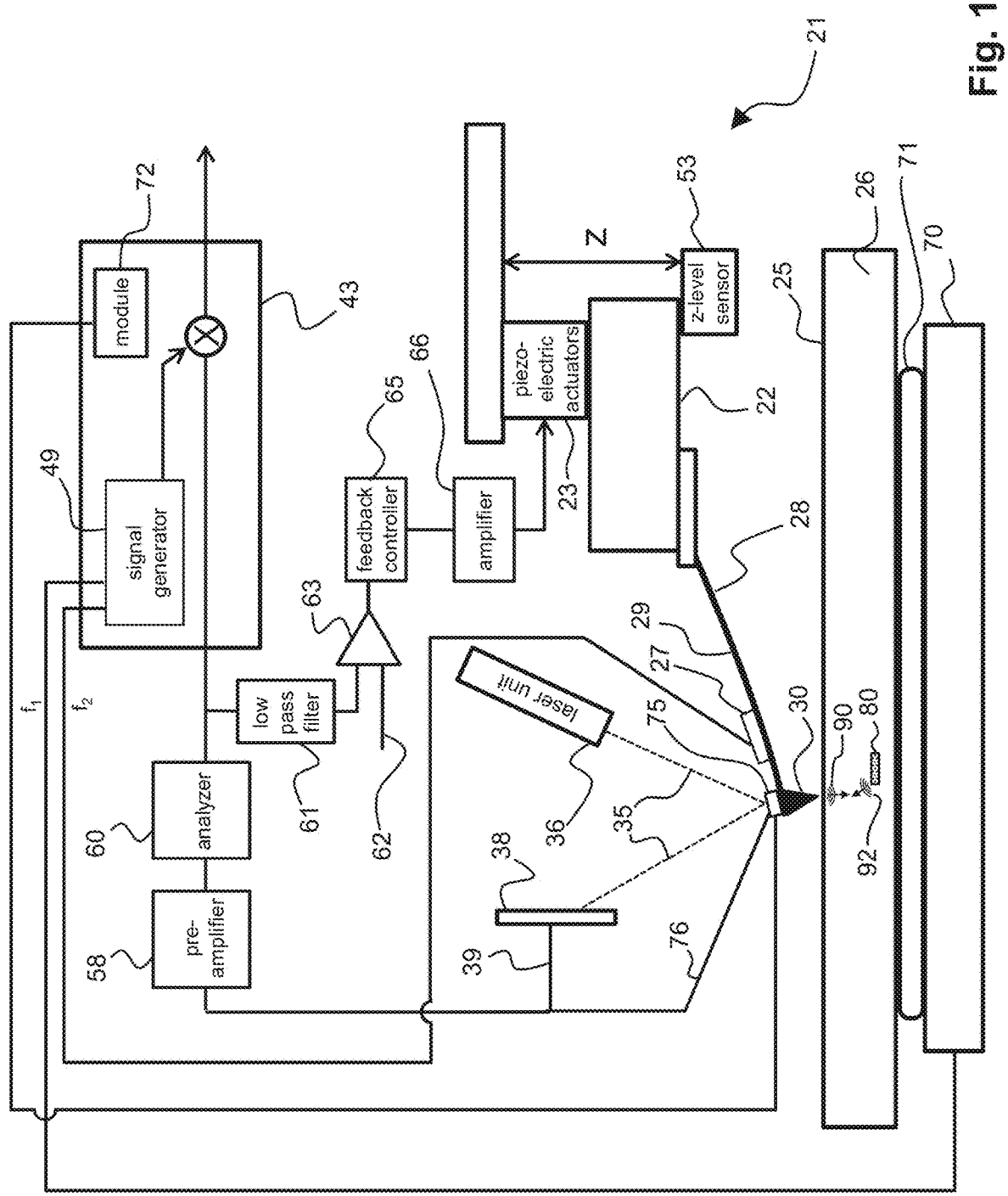
FIG. 1 schematically illustrates a system in accordance with the present invention.

FIG. 1 schematically illustrates a measurement system 21 in accordance with an embodiment of the invention. The system 21 may be applied for performing a method in accordance with the present invention, for example the method in accordance with the embodiment illustrated in FIG. 2-4 amongst others. In the system 21, a probe 28 is attached to a actuator stage or scan head 22. The scan head 22 enables scanning of the probe 28 relative to the surface 25 of a sample 26. The probe 28 consists of a cantilever 29 and a probe tip 30. During scanning, the probe tip 30 is brought in contact with the surface 25 of the sample 26. For example the probe tip 30 may be scanned across the surface 25 of the sample 26 in contact mode (continuous contact between the probe tip 30 and the surface 25 of the sample 26). A laser unit 36 provides a collimated laser beam 35 that impinges on a (specular reflective) section at the back of the probe 28 and reflects towards an optical detector 38 (e.g. photo diode). Using the optical detector 38, vibrations in the cantilever 29 can be sensed due to small deflections of the reflected beam 35 under influence of such vibrations. This provides an output signal 39 for further analysis. As may be appreciated, although in FIG. 1 a single scan head 22 is depicted, the method may equally be applied in systems including multiple scan heads.

The present system enables to apply a very high frequency acoustic input signal 90 (e.g. see FIG. 3) to the sample 26. This very high frequency acoustic input signal, having a frequency in a range above 1 gigahertz, is the second acoustic input signal referred to herein before (the first acoustic input signal will be described further down below). The acoustic input signal 90 in FIG. 1 is applied using a piezo type actuator 75 mounted on the non-contact side (i.e. back side) of the probe tip 30. The acoustic input signal 90 propagates via the probe tip 30 into the sample 26. Within sample 26, provided that a probe tip is used with a sharp tip (providing a small enough contact area with the sample surface 25), the acoustic input signal 90 propagates as a point source signal 90 as illustrated in the figure. Alternative manners of stimulating the probe tip 30 such as to apply the very high frequency acoustic input signal 90 via the tip 30 to the sample 26, may for example include stimulation by a pulsed or intensity varied laser (not shown) making use of the thermal effects of expansion and contraction to generate the acoustic signal. This may be achieved using laser 36 and laser beam 35, or a separate laser beam (not shown), impinging on a material layer on the probe 28 for example.

The acoustic input signal 90 will propagate through the material of sample 26, and any structures 80 or density variations encountered will cause a fraction 92 of the input signal 90 to be scattered back to surface 25.

The acoustic input signal 90 may be of short duration, e.g. a pulse signal such as a delta pulse, or the acoustic input signal 90 may be of long duration or even continuous. If a short duration signal 90 is applied, the pulse signal or pulse train applied must be short enough to ensure that forward and backward propagation of the discontinuous signal in the sample do not mix. The spatial pulse length may thus be dependent on the material (as the sound velocity for different materials is different) and may be shorter for softer materials while being longer for harder materials. In some embodiments, the discontinuous signal has a signal time duration shorter than the intended detection depth divided by the speed of sound in the primary material of the sample. Applying a short duration acoustic input signal 90 into the sample will cause a scattered return signal 92, scattered from any present embedded elements 80 in the sample 26, to be received.

If on the other hand a long signal or continuous signal is applied, any elements 80 will likewise scatter a fraction 92 back. However, the scattered return signal 92 will then be received while the input signal 90 is still being applied. Additional analysis steps in the analysis of an output signal may thus be required to separate the applied input signal 90 from the output signal to find the return signal 92. For example, using phase dependent filtering, signal fractions of equal phase as the input signal 90 may be ignored in the output signal such as to yield only those fractions that originate from a return signal 92 scattered by an embedded element 80 in the sample. Other techniques may likewise be applied to perform such filtering. The application of a continuous acoustic input signal 90 on the other hand reduces complexity at the input side, and speeds up the measurement greatly by not having to perform an alternating send-receive sequence of applying the signal 90 and listening to the return signal.

The sensing of the return signal 92 may be performed in various different manners. The return signal 92 may for example be picked up using the probe 28. The return signal 92 may be obtained using the probe 28, by scanning the probe tip 30 across the surface 25 in contact mode. The output signal 39 is obtained using a laser beam 35 specular reflected off the back of the probe tip 30 or the cantilever 29 or off the back of actuator 75, and incident onto a photo diode 38, e.g. a quadrant type photo diode. The probe tip 30 in contact with surface 25 will receive the induced acoustic vibrations of return signal 92. Any sub-surface structures 80 may be visualized by analysis of return signal 92 received via the vibration response of the cantilever 29 and the probe tip 30. The return signal 92 may be analyzed by analysis of the output signal 39 from photo sensor 38. Proper analysis of output signal 39 allows to isolate the signal components corresponding to the return signal 92. This output signal 39 is provided to the analysis system 43 to perform such analysis. In the analysis system 43, a hardware or software module 72 isolates the scattered fraction 92 from the output signal 39 to provide an image of the subsurface structures 80.

Alternatively, the return signal 92 may also be received using piezo type actuator 75 as a sensor. As may be appreciated, actuator 75 is particularly responsive to acoustic signals within the frequency range of the input signal 90, because it is also used to apply the acoustic input signal 90. Thus, an output signal 76 from the actuator/sensor 75 may be provided directly to the analyzer system 43 to perform such an analysis.

System 21 further includes a transducer 70 mounted underneath the sample 26, and a further transducer 27 mounted on cantilever 29. The transducers 70 and 27 enable the system 21 to simultaneously apply additional ultrasonic force microscopy (UFM) at lower frequencies. In system 21, simultaneous to the application of the very high frequency acoustic input signal 90 applied to sample 26, the transducer 70 may for example apply a further acoustic input signal at a frequency f1 within a frequency range of 1 to 250 megahertz (MHz). An additional low frequency signal at frequency f2 in the same frequency range as f1 is applied via transducer 27 on the cantilever 29, such that the difference f1−f2 is near one of the resonance frequency of the cantilever (e.g. between 100 kilohertz (kHz) and 1 MHz; say 550 kHz as an example). The transducers 70 and 27 may be piezo type transducers or other suitable transducers. The transducer 27 may be mounted on the cantilever 29 as indicated, or on the back side of the probe tip 30 (i.e. above the probe tip 30), or near the mounting of the probe 28 to scan head 22. Any location where vibrations from the transducer 27 may be effectively fed into the probe 28 may be suitable for mounting the transducer 27. The signal at frequency f2 may alternatively even be applied directly to the sample 26, or even via transducer 70. Transducer 70 does not have to be located underneath the sample 26, but may be located on the surface 25 or even on a side of the sample 26. Moreover, both signals from transducers 70 and 27 may be applied by a single transducer, making any or both of these two transducers obsolete in that case. The signals at frequencies f1 and f2 may also both be applied via the transducer 27 on the cantilever 29. Optionally, a coupling medium 71 (e.g. a liquid, an oil or grease (e.g. vaseline)) may be applied to provide a low resistance coupling between the acoustic transducer 70 and the sample 26.

Notwithstanding the abovementioned alternatives, in FIG. 1 the analyzer system 43 of system 21 comprises a signal generator 49 that enables to generate a first ultrasonic input signal 51 including frequency f1 and a second ultrasonic input signal 52 including frequency f2. In FIG. 1, the first ultrasonic input signal 51 of frequency f1 is applied via transducer 70 as an acoustic signal 52 during scanning of the probe 28 across the surface 25. The transducer 27 in contact with the cantilever 29 receives the second ultrasonic input signal 52 including frequency f2. The high frequency ultrasound signal at frequency f1 causes indentation of the probe tip 30 against the surface 25. Tip-sample interaction between the probe tip 30 and the surface 25 causes the resonance frequency of the probe to shift. This is dependent on the local elastic properties of the sample, which in turn depends on the subsurface structure. Hence, structures within the elastic stress field (Hertzian field) can be measured by analysis of the output signal 39 around the resonance frequency (i.e. near f2, or f2−f1 in heterodyne excitation). The effect may be compared with feeling an object through a pillow, i.e. the changes in the output signal 39 caused by resonance frequency shifts allow to visualize subsurface structures.

As explained above, the penetration depth of the stress field is limited (up to e.g. 300 nanometer below the surface), and deeper structures may be detected using the abovementioned very high frequency discontinuous signal applied to the sample 26. However, the additional information on shallow structures, obtained from the latter type of UFM measurement provides additional information useable to increase accuracy, as well as structural information e.g. of the integrity of various layers within the shallow stress field. In and industrial setting, such additional measurements may be highly valuable in a manufacturing process.

In addition to mapping sub-surface structures, the system 21 may further be arranged for performing regular atomic force microscopy such as to map on-surface structures on the surface 25. In FIG. 1, to this end, the output signal 39 after pre-amplification in pre-amplifier 58 and after pre-analysis in analyzer 60, is provided both to the lockin amplifier analysis system 43 and to a low pass filter 61. The low pass filter removes the high frequency components relating to the sub-surface measurements from the output signal and provides the signal to a comparator 63. The comparator compares the output signal with the set-point that is received at input 62 (e.g. from a controller system), and yields a differential signal that is provided to the feedback controller 65. The feedback controller provides a control signal to amplifier 66 for driving the piezo-electric actuators 23 for adjusting the z-level of the probe 28, i.e. the distance in height of the probe 28 above the surface 25. The corrections, which may be obtained from the feedback controller 65 by analyzing the control signal, may be more accurately determined with z-level sensor 53. The determined z-level corrections are mapped to provide a surface topography map of the surface 25.

Herein below, a plurality of different embodiments of the method of the present invention will be briefly discussed, with reference to the figures. These embodiments include various different implementations of both the application of the acoustic input signal 90 to the sample 26, as well as the detection of the return signal 92. The various embodiments further include the additional application of ultrasonic AFM (UAFM) at frequencies wherein tip-sample interaction is governed by local elastic properties, applying additional subsurface imaging at shallow depths up to 150 nanometer below the surface 25.

In the embodiment of FIG. 2, the probe 28 comprises a cantilever 29. At the front end of the cantilever 29, a probe tip array 31 comprises a probe tip head with a plurality of probe tips 30-1, 30-2 and 30-3. Above each of the probe tips 30-1 through 30-3, an associated piezo actuator/transducer 75-1, 75-2, and 75-3 is attached to the probe tip array 31. Acoustic input signals 90 from each of the respective piezo actuators 75-1, 75-2, and 75-3, propagate through the probe tip array 31 towards the respective probe tips 30-1 through 30-3. At the surface 25 of the sample 26, the very high frequency acoustic input signals 90 are transferred into the sample 26. The coupling into the sample 26 takes place via the sharp end of each of the probe tips 30-1 through 30-3. Therefore, within the samples 26, each of the very high frequency input signals 90 acts as a point source signal, as is illustrated by the respective input signals 90-1, 90-2 and 90-3 corresponding to each probe tip.

The signals to be applied by each of the actuators 75-1, 75-2 and 75-3 are received from generator 72 where these are generated as described above, although alternatively of course these signals could be generated in a myriad of different manners. However, in the present embodiment, controller 85 (amongst other things) may control a plurality of delays 82-1, 82-2 and 82-3 such that the phase of the acoustic input signals 90-1, 90-2 and 90-3 is different dependent on the setting of each one of the delays 82-1, 82-2, 82-3. Each delay 82-1, 82-2 and 82-3 is associated with a single one of the actuators 75-1, 75-2 and 75-3 respectively. In this manner, the phases of the input signal 90-1, 90-2 and 90-3 may be controlled in such a manner that the combined wave in the sample 26 comprises the wave front 93 which is suitably shaped as desired for the respective measurement. For example, as illustrated in FIG. 2, the wave front 93 may be focused onto a certain focal point (e.g. a certain depth within the sample 26 below the surface 25). Alternatively, a defocused wave front may be generated, or the faces may be controlled to provide a linear wave front being angled with respect to the surface 25.

The probe tip array 31 in this manner provides the possibility to apply a phased array type of measurement. For example using the focused wave front 93, by focusing the wave front 93 onto a certain focal point the intensity of the very high frequency acoustic input signal 90 will be the highest in the focal point. In case embedded element 80 is located at this respective depth that coincides with the focal point, it will provide a very strong return signal 92 that may be picked up at the surface 25.

Figure 5:
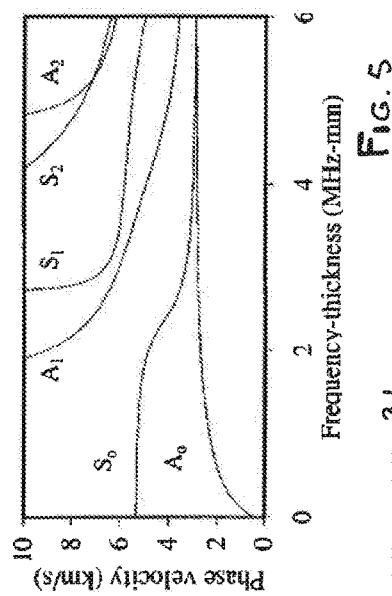
FIG. 5 schematically illustrates a propagation velocity dependency graph for guided waves.
Figure 3:
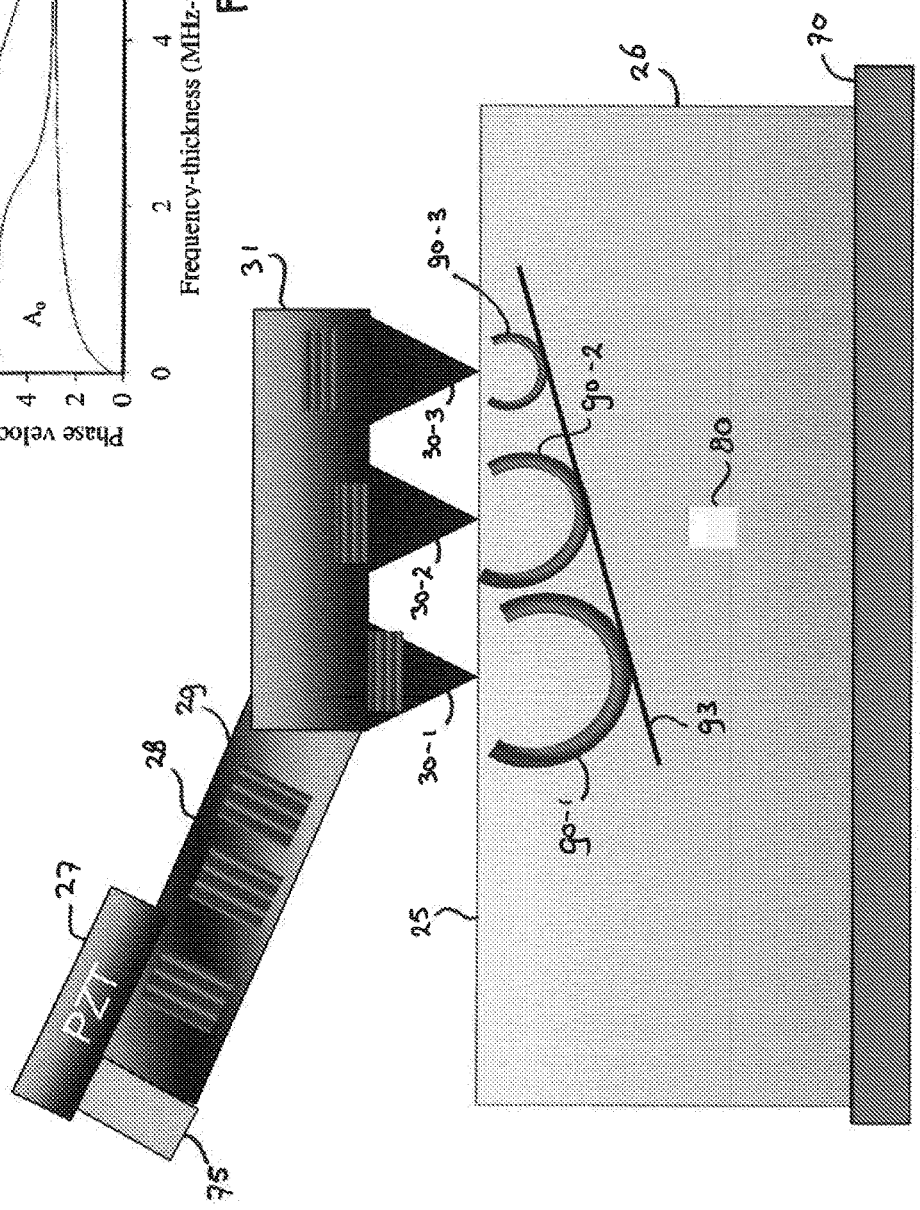
FIG. 3 schematically illustrates a method in accordance with an embodiment of the invention.

The embodiment illustrated in FIG. 3 provides a different manner of applying the phased array concept for imaging. Here, the actuator 75 for providing the very high frequency acoustic input signal 90 is attached to the back end of the cantilever 29 of the probe 28. The back end, for the purpose of explanation, is the remote end of the cantilever with respect to the probe tip. The very high frequency acoustic input signal 90 is applied via the transducer 75 into the cantilever 29, the cantilever 29 thereby serving as a waveguide. In this manner, the acoustic input signal 90 is applied as a guided wave which propagates through the cantilever 29. As follows from the graph in FIG. 5, the phase velocity (in kilometers per second) depends on both the frequency of the input signal applied by the actuator 75 and on the thickness of the cantilever 29. The phase velocity further depends on whether the guided wave induced by the acoustic input signal 90 is a symmetric wave (S-modes S0, S1 and S2) or an anti-symmetric wave (A-modes A0, A1, A2). Considering at first a single frequency acoustic input signal 90, the thickness of the cantilever 29 is fixed during the measurement, and the input signal 90 propagates through the cantilever towards the probe tips 30-1, 30-2 and 30-3. The acoustic input signal subsequently reaches each of the probe tips 30-1 through 30-3, and is coupled via each of the probe tips into the sample 26. Assuming linear propagation through the system illustrated in FIG. 3, the point sources 90-1, 90-2 and 90-3 will form a wave front 93 that is plane but angled with respect to the sample surface 25.

Given the dependencies of the propagation velocity with respect to the frequency, it is also possible to design the very high frequency acoustic input signal 90 by including various frequency components such as to obtain a desired wave front 93. In this manner a different plane wave front or even a non-plane wave front (e.g. focused) may be obtained without requiring a controller or delays as in the embodiment of FIG. 2. As may be appreciated, in absence of a controller or delays, the possibilities of shaping the wave front are somewhat more limited, however this embodiment only requires a single piezo actuator 75 for the very high frequency acoustic input signal 90 and no controllers or delays for this purpose.

A further embodiment of the present invention is illustrated in FIG. 4. In FIG. 4, the probe tip 30 comprises a contact area 100 with which contact is made with the surface 25 of the sample 26. The contact area 100 is not sharp, but deliberately a relatively large contact area has been devised such as to apply the very high frequency acoustic input signal 90 across the full contact area 100. This creates an acoustic beam 96 in the sample where the acoustic signal intensity is very high. Outside the beam 96, much lower acoustic intensities of the very high frequency component are present. As may be appreciated, if an embedded element 80 coincides with the sound beam 96, a strong return signal will be scattered which can be picked up with a high signal-to-noise ratio at the surface 25.

Not only the size of the contact area 100 is important to obtain a sound beam, providing the contact area 100 with a certain cross sectional shape has some further advantages. For example, the shape of the contact area 100 may be square, round, oval, polygon, or any of these or other shapes. The intensity profile of the acoustic signal within the beam 96 is dependent on the shape of the contact area 100. Using for example a round shape as is done in the embodiment of FIG. 4, results in the sound beam 96 to comprise a certain area where the intensity of the acoustic input signal 90 is very high. This focal area is schematically and generally indicated within the oval 102 in FIG. 4 as a dark area within the beam 96. This can be used to focus the beam at a certain depth and to obtain a large amount of information from this depth.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of performing subsurface imaging of one or more embedded structures in a substrate underneath a substrate surface, the method being performed using an atomic force microscopy system, wherein the atomic force microscopy system comprises a probe with at least one probe tip, and a sensor for sensing a position of the probe tip for detecting probe tip motion, the method comprising:
    positioning the at least one probe tip relative to the substrate for establishing contact between the at least one probe tip and the substrate surface;
    applying, using at least one first signal application actuator, a first acoustic input signal to the substrate;
    applying, using at least one second signal application actuator, a second acoustic input signal to the substrate;
    detecting, using the sensor, an output signal from the substrate arising from the first acoustic input signal and the second acoustic input signal; and
    analyzing the output signal for obtaining information on the embedded structures, for enabling imaging thereof;
    wherein the first acoustic input signal comprises a first signal component and a second signal component,
    wherein the first signal component has a frequency below 250 megahertz and the second signal component has either: a frequency below 2.5 megahertz or a frequency providing a difference frequency of at most 2.5 megahertz with the first signal component, so as to enable analysis of an induced stress field in the substrate; and
    wherein the second acoustic input signal comprises a third signal component having a frequency above 1 gigahertz, so as to provide, in the output signal, at least one of the group consisting of:
        a return signal including a scattered fraction of the second acoustic input signal scattered from the embedded structures; and
        a transmitted second acoustic input signal whose wavefront is distorted due to scattering from the embedded structures.

2. The method according to claim 1, wherein the at least one second signal application actuator is attached to the at least one probe tip, and wherein the second acoustic input signal is applied via the at least one probe tip.

3. The method according to claim 2, wherein the at least one probe comprises a plurality of probe tips forming a probe tip array, wherein during the positioning, the probe is positioned so as to establish contact between the substrate surface and each of the probe tips.

4. The method according to claim 3, wherein one or more of the at least one second signal application actuator is attached to the plurality of probe tips, such that each probe tip has associated therewith at least one of the second signal application actuators, for applying a plurality of second acoustic input signals through the plurality of probe tips, wherein the method comprises:
  controlling, using a controller, operation of the second signal application actuators so as to control a phase difference between each two signals of the plurality of second acoustic input signals, so as to provide a combined wave front of the plurality of second acoustic input signals having a controllable shape.

5. The method according to claim 4, wherein the controlling of the second signal application actuators is performed so as to generate at least one of the group consisting of:
  a focused wave front focused at a focal point relative to the plurality of probe tips;
  a defocused wave front; and
  a plane wave front, wherein the plane wave front is one of the group consisting of:
    parallel to the substrate surface, and
    under an angle with the substrate surface.

6. The method according to claim 3, wherein the probe comprises a cantilever having a front end where the at least one probe tip is located and a back end forming a remote opposite end of the cantilever relative to the front end,
  wherein the at least one second signal application actuator is attached to the cantilever at the back end, and
  wherein the method comprises applying the second acoustic input signal as a guided wave through the cantilever, and wherein a phase of the second acoustic input signal applied via each probe tip of the plurality of probe tips is dependent on a relative position of the respective probe tip,
  wherein ones of the plurality of probe tips are positioned so as to provide a combined wave front having a shape determined by the phases of the second acoustic input signal applied via each probe tip of the plurality of probe tips.

7. The method according to claim 6, wherein at least one position of positions of the plurality of probe tips and a thickness or shape of the cantilever is configured so as to provide a phase delay between signal parts of the second acoustic input signal applied via each probe tip, for providing at least one of the group consisting of:
  a plane wave front, which is one of parallel to the substrate surface or under an angle with the substrate surface; and
  a defocused wave front.

8. The method according to claim 1, wherein the at least one probe tip comprises a contact surface for being in contact with the substrate surface, wherein a surface area of the contact surface is taken from the group consisting of:
  for providing the second acoustic input signal as a point source signal, the contact surface has a contact surface area smaller than $1.25*10^3$ square nanometer; and
  for providing the second acoustic input signal as a sound beam, the contact surface has a contact surface area larger than $1.25*10^3$ square nanometer.

9. The method according to claim 1, wherein the probe tip comprises a contact surface for being in contact with the substrate surface, wherein the contact surface has shape selected from the group consisting of: square, rectangle, circular, oval, square or rectangular with rounded corners, triangular, and polygonal.

10. An atomic force microscopy system configured for performing subsurface imaging of one or more embedded structures in a substrate underneath a substrate surface, wherein the atomic force microscopy system comprises a probe with at least one probe tip, and a sensor for sensing a position of the probe tip for detecting probe tip motion, the system further comprising:
  an actuator stage for positioning the at least one probe tip relative to the substrate for establishing contact between the at least one probe tip and the substrate surface;
  at least one first signal application actuator for applying a first acoustic input signal to the substrate; and
  at least one second signal application actuator for applying a second acoustic input signal to the substrate;
  wherein the sensor is configured for detecting an output signal from the substrate arising from the first acoustic input signal and the second acoustic input signal;
  wherein the system further comprises an analyzer configured for analyzing the output signal for obtaining information on the embedded structures for enabling imaging thereof;
  wherein the first signal application actuator is configured for applying the first acoustic input signal comprising a first signal component and a second signal component, wherein the first signal component has a frequency below 250 megahertz, and the second signal component has either: a frequency below 2.5 megahertz or a frequency providing a difference frequency of at most 2.5 megahertz with the first signal component, so as to enable analysis of an induced stress field in the substrate; and
  wherein the second signal application actuator is configured for applying the second acoustic input signal comprising a third signal component having a frequency above 1 gigahertz, so as to provide, in the output signal, at least one of the group consisting of:
    a return signal including a scattered fraction of the second acoustic input signal scattered from the embedded structures; and
    a transmitted second acoustic input signal whose wavefront is distorted due to scattering from the embedded structures.

11. The atomic force microscopy system according to claim 10, wherein the at least one second signal application actuator is attached to the at least one probe tip so as to apply the second acoustic input signal via the at least one probe tip.

12. The atomic force microscopy system according to claim 11, wherein the at least one probe comprises a plurality of probe tips forming a probe tip array, so as to enable positioning of the probe for establishing contact between the substrate surface and each of the probe tips.

13. The atomic force microscopy system according to claim 12, wherein a one or more of second signal application actuators is attached to the plurality of probe tips, such that each probe tip has associated therewith at least one of the second signal application actuators, for applying a plurality of second acoustic input signals through the plurality of probe tips, wherein the system further comprises a controller for controlling operation of the second signal application actuators so as to control a phase difference between each two signals of the plurality of second acoustic input signals, so as to enable providing a combined wave front of the plurality of second acoustic input signals having a controllable shape.

14. The atomic force microscopy system according to claim 12, wherein the probe comprises a cantilever having a front end where the at least one probe tip is located and a back end forming a remote opposite end of the cantilever relative to the front end, wherein the at least one second signal application actuator is attached to the cantilever at the back end so as to apply the second acoustic input signal as a guided wave through the cantilever, and wherein a phase of the second acoustic input signal applied via each probe tip is dependent on a relative position of the respective probe tip, wherein the probe tips are positioned so as to provide a combined wave front having a shape determined by the phases of the second acoustic input signal applied via each probe tip.

15. The atomic force microscopy system according to claim 10, wherein the probe tip comprises a contact surface for being in contact with the substrate surface, wherein the contact surface physical surface is at least one of the group consisting of:

the contact surface has a contact surface area smaller than $1.25*10^3$ square nanometer for providing the second acoustic input signal as a point source signal; and the contact surface has a contact surface area larger than $1.25*10^3$ square nanometer for providing the second acoustic input signal as a sound beam.

16. The atomic force microscopy system according to claim 10, wherein the at least one probe comprises a plurality of probe tips forming a probe tip array, so as to enable positioning of the probe for establishing contact between the substrate surface and each of the probe tips.

17. The atomic force microscopy system according to claim 10, wherein the probe tip comprises a contact surface for being in contact with the substrate surface, and
wherein the contact surface has shape selected from the group consisting of: square, rectangle, circular, oval, square or rectangular with rounded corners, and triangular.

18. The method according to claim 1, wherein the at least one probe comprises a plurality of probe tips forming a probe tip array, wherein during the positioning the probe is positioned so as to establish contact between the substrate surface and each of the probe tips.

* * * * *